Patented Aug. 27, 1946

2,406,504

UNITED STATES PATENT OFFICE 2,406,504

NITRO KETALS AND PROCESS FOR PREPARATION THEREOF

Glen H. Morey, Terre Haute, Ind., assignor to Commercial Solvents Corporation, Terre Haute, Ind., a corporation of Maryland No Drawing. Application July 29, 1944, Serial No. 547,283

8 Claims. (Cl. 260—338)

The present invention relates to a series of new ketals and to a process for their preparation. More particularly it pertains to ketals having diversified functional groups. Specifically, such compounds may be graphically represented by the following formula:

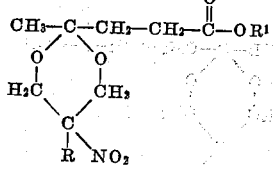

wherein the substituent R may be either hydrogen or alkyl, and $R^1$ represents an alkyl group. Compounds of the above type are prepared by reacting a suitable 2-nitro-1,3-propanediol with an alkyl levulinate in the presence of a small quantity of acid catalyst. The process is preferably effected by heating the reaction mixture in the presence of an inert water-immiscible liquid such as benzene, toluene or a similar substance, in order to remove the water produced substantially as it is formed. The reaction mixture is preferably heated at its reflux temperature until approximately the theoretical quantity of water has been removed. Thereafter, distillation is discontinued, and the mixture washed with water to remove the catalyst. Separation of the inert water-immiscible liquid and water, as well as other impurities is readily accomplished by distillation. The inert liquid and water are removed at atmospheric pressure, while the higher boiling impurities, such as, unreacted alkyl levulinate or 2-nitro-1,3-propanediol are separated from the ketal thus produced by distillation under reduced pressure. Further purification of the desired product which is obtained as a residue may be readily effected by distillation under relatively high vacuum.

One of the highly surprising features of the process of the present invention is the fact that said process has been found to be operative only with 2-nitro-1,3-propanediols. Attempts to carry out the same type of reaction with the ordinary glycols such as ethylene glycol or with the trihydric nitro alcohols, such as, tris(hydroxymethyl)-nitromethane have been completely without success. With the ordinary glycols, complex mixtures of products are obtained, which cannot be separated, whereas, with compounds such as tris-(hydroxymethyl) nitromethane, no reaction whatever was observed to occur. In the case of the 2-nitro-1,3-propanediols, however, the reaction involved appears to be quite general and is readily effected between any alkyl levulinate and any 2-nitro-1,3-propanediol.

The acid catalyst utilized in producing the new ketals of my invention may be selected from a relatively wide range of compounds. In fact, it may generally be said that any acid previously known to be capable of promoting esterification will be satisfactory for my purpose. Specific examples of such acids are: p-toluene-sulfonic acid, sulfuric acid, hydrochloric acid, and the like.

The alkyl levulinates and 2-nitro-1,3-propanediols employed in carrying out the process of the present invention likewise may be selected from a wide variety of compounds. Typical examples of alkyl levulinates operative in my process are methyl levulinate, butyl levulinate, hexyl levulinate, decyl levulinate, and the like. Examples of suitable 2-nitro-1,3-propanediols are 2-nitro-1,3-propanediol, 2-nitro-2-methyl-1,3-propanediol, 2-nitro-2-ethyl-1,3-propanediol, 2-nitro-2-propyl-1,3-propanediol, 2-nitro-2-butyl-1,3-propanediol, and the like.

My invention may be further illustrated by the following specific examples:

Example I

To a mixture consisting of 149 g. of 2-ethyl-2-nitro-1,3-propanediol, 200 g. of butyl levulinate and 300 cc. of benzene, was added 1 g. of para-toluene sulfonic acid. This mixture was then heated to reflux temperature and the water produced during the ketalization removed with benzene, the latter being continuously returned to the distillation flask. After about twenty-four hours, 16.5 cc. of water was removed, heating was then discontinued, and the mixture washed with cold water. The major portion of the benzene was then distilled off at atmospheric pressure while the last portions thereof were removed at 90° C. (30 mm.). The crude butyl-2-methyl-5-ethyl-5-nitro-2-m-dioxanepropionate was then distilled in vacuo. A fraction was collected below 125° C. (5 mm.) and consisted chiefly of unreacted butyl levulinate. The pure ketal boiled at 190° C. (3 mm.) and amounted to 219 g. corresponding to a yield of 72% of theory.

Analysis: Calculated for $C_{12}H_{25}NO_6$—N, 4.62. Found: N, 5.15.

Example II

In accordance with the procedure described in Example I, ethyl 2-methyl-5-ethyl-5-nitro-2-m-dioxane-propionate was prepared from 2-nitro-2-ethyl-1,3-propanediol and ethyl levulinate in the presence of approximately 1 g. of sulfuric acid. The product thus obtained was a crystalline compound, melting at 83° C. and was obtained in a yield corresponding to 60% of theory.

Analysis: Calculated for $C_{12}H_{21}NO_6$—N, 5.09. Found: N, 5.66. Molecular weight: found 269; theory, 275.

It is to be specifically understood that I in no way desire to limit the present invention to the compounds disclosed in the specific examples given above. On the contrary, as previously indicated, the process involved is generally applicable to any alkyl levulinate and any 2-nitro-1,3-propanediol.

The new ketals of the present invention have been found to be useful as placticizers for various film forming materials, particularly those consisting essentially of vinyl chloride polymers. Other uses of these compounds will be readily apparent to those skilled in the art.

My invention now having been described, what I claim is:

1. Substituted 5-nitro-1,3-dioxanes having the following general formula:

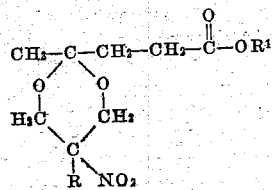

wherein the substituent R represents a member selected from the group consisting of hydrogen and alkyl and $R^1$ is alkyl.

2. Butyl 2-methyl-5-ethyl-5-nitro-2-m-dioxane-propionate.

3. Ethyl 2-methyl-5-ethyl-5-nitro-2-m-dioxane propionate.

4. In a process for the preparation of substituted 5-nitro-1,3-dioxanes having the formula:

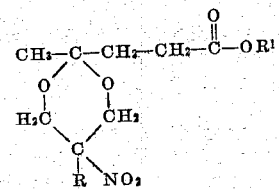

in which the substituent R represents a member selected from the class consisting of hydrogen and alkyl, and $R^1$ is alkyl, the steps which comprise mixing a 2-nitro-1,3-propanediol with an alkyl levulinate in the presence of an esterification catalyst and an inert water-immiscible liquid, heating the resultant mixture to its reflux temperature, removing the water in a vaporous state with said water-immiscible liquid and recovering the aforesaid substituted 5-nitro-1,3-dioxane.

5. In a process for the preparation of substituted 5-nitro-1,3-dioxanes of the formula:

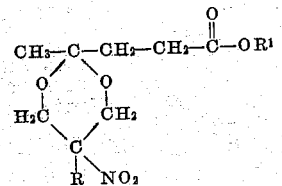

in which the substituent R represents a member selected from the group consisting of hydrogen and alkyl, and $R^1$ is alkyl, the steps which comprise mixing an alkyl levulinate with a 2-nitro-1,3-propanediol in the presence of an esterification catalyst, heating the resultant mixture and recovering a compound of the aforesaid formula.

6. In a process for the preparation of substituted 5-nitro-1,3-dioxanes of the formula:

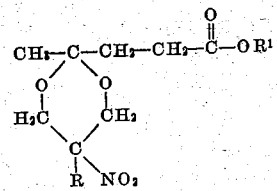

in which the substituent R represents a member selected from the group consisting of hydrogen and alkyl, and $R^1$ is alkyl, the steps which comprise mixing a 2-nitro-1,3-propanediol with an alkyl levulinate in the presence of an esterification catalyst and benzene, heating the resultant mixture to its reflux temperature, removing the water in a vaporous state with said benzene and recovering the aforesaid substituted 5-nitro-1,3-dioxane.

7. The process of claim 6 in which the alkyl levulinate is butyl levulinate and the 2-nitro-1,3-propanediol is 2-nitro-2-ethyl-1,3-propanediol.

8. The process of claim 6 in which the alkyl levulinate is ethyl levulinate and the 2-nitro-1,3-propanediol is 2-nitro-2-ethyl-1,3-propanediol.

GLEN H. MOREY.